US012583678B2

(12) United States Patent     (10) Patent No.:   US 12,583,678 B2

Fosnight     (45) Date of Patent:    Mar. 24, 2026

(54) APPARATUS AND METHOD FOR REPLACING POWER SUPPLY DEVICE IN A UAV

(71) Applicant: Symbotic LLC, Wilmington, MA (US)

(72) Inventor: William J. Fosnight, Windham, NH (US)

(73) Assignee: Symbotic LLC, Wilmington, MA (US)

( * ) Notice: Subject to any disclaimer, the term of this patent is extended or adjusted under 35 U.S.C. 154(b) by 455 days.

(21) Appl. No.: 18/215,060

(22) Filed: Jun. 27, 2023

(65) Prior Publication Data

US 2023/0415997 A1     Dec. 28, 2023

Related U.S. Application Data

(60) Provisional application No. 63/355,858, filed on Jun. 27, 2022.

(51) Int. Cl.
| | |
|---|---|
| *B65G 1/137* | (2006.01) |
| *B60L 53/53* | (2019.01) |
| *B60L 53/80* | (2019.01) |
| *B64U 10/16* | (2023.01) |
| *B64U 50/39* | (2023.01) |
| *B64U 70/90* | (2023.01) |
| *B64U 101/66* | (2023.01) |
| *G06Q 10/08* | (2024.01) |

(52) U.S. Cl.
CPC ............ *B65G 1/1375* (2013.01); *B60L 53/53* (2019.02); *B60L 53/80* (2019.02); *B64U 10/16* (2023.01); *B64U 50/39* (2023.01); *B64U 70/90* (2023.01); *B60L 2200/10* (2013.01); *B64U 2101/66* (2023.01); *G06Q 10/08* (2013.01)

(58) Field of Classification Search
CPC .... B65G 1/1375; B65G 1/065; B65G 1/1373; B60L 53/53; B60L 53/80; B60L 2200/10; B60L 2101/66; B60L 2260/32; B64U 10/16; B64U 50/39; B64U 70/90; B64U 10/13; B64U 50/19; B64U 80/70; B64U 2101/60; G06Q 10/08; B64C 39/024
See application file for complete search history.

(56) References Cited

U.S. PATENT DOCUMENTS

| | | | | |
|---|---|---|---|---|
| 6,799,993 | B2* | 10/2004 | Krieger | H01M 50/256 439/500 |
| 9,139,310 | B1 | 9/2015 | Wang | |
| 9,139,363 | B2 | 9/2015 | Lert | |
| 9,481,458 | B2 | 11/2016 | Casado Magaña et al. | |
| 9,598,239 | B2 | 3/2017 | Lert, Jr. | |
| 9,771,162 | B1 | 9/2017 | Gentry | |

(Continued)

FOREIGN PATENT DOCUMENTS

| | | |
|---|---|---|
| WO | 2015104263 | 7/2015 |
| WO | 2018151729 | 8/2018 |

*Primary Examiner* — Michael Collins

(74) *Attorney, Agent, or Firm* — Perman & Green, LLP

(57) ABSTRACT

An order fulfillment facility with a delivery system is disclosed having plurality of mobile robots with containers to bring customer orders and/or power supply device/s to UAV/s for final delivery. UAV leaves the discharged power supply devices that are received in empty container and transported to storage area for replenishment and diagnostic checks. Order fulfillment operations along with power supply device charging and monitoring is performed to achieve timely delivery of customer orders.

10 Claims, 10 Drawing Sheets

(56)  References Cited

U.S. PATENT DOCUMENTS

| | | | |
|---|---|---|---|
| 9,777,502 B2 | 10/2017 | Curlander | |
| 9,873,408 B2 | 1/2018 | Capizzo | |
| 10,040,370 B2 | 8/2018 | Wei | |
| 10,363,826 B2 | 7/2019 | Wang | |
| 10,435,241 B2 | 10/2019 | Lert | |
| 10,457,421 B2 | 10/2019 | O'Toole | |
| 10,562,398 B2 | 2/2020 | High | |
| 10,580,311 B2 | 3/2020 | Schmalzried | |
| 10,683,102 B2 | 6/2020 | Cohen | |
| 10,919,701 B2 | 2/2021 | Lert, Jr. | |
| 10,981,724 B2 | 4/2021 | Lert, Jr. | |
| 10,984,497 B2 | 4/2021 | Lert, Jr. | |
| 10,986,951 B2 | 4/2021 | Mitchell | |
| 11,142,398 B2 | 10/2021 | Lert, Jr. | |
| 11,142,402 B2 | 10/2021 | Lert, Jr. | |
| 11,342,780 B1 * | 5/2022 | Brown | H02J 7/35 |
| 11,905,058 B2 * | 2/2024 | Lert, Jr. | G06Q 10/08 |
| 12,319,502 B2 * | 6/2025 | Lert, Jr. | B65G 1/0492 |
| 2011/0106294 A1 | 5/2011 | Bebbington | |
| 2018/0150793 A1 | 5/2018 | Lert, Jr. | |
| 2018/0208070 A1 | 7/2018 | Sanchez | |
| 2018/0312069 A1 | 11/2018 | Mcclymond | |
| 2019/0196511 A1 | 6/2019 | Millhouse | |
| 2020/0013008 A1 | 1/2020 | Newcomb | |
| 2021/0221611 A1 | 7/2021 | Davidson | |
| 2021/0380019 A1 | 12/2021 | Livingston | |
| 2022/0041363 A1 * | 2/2022 | Lindhart | B65D 25/08 |
| 2022/0127014 A1 | 4/2022 | Cowden | |
| 2023/0095505 A1 * | 3/2023 | Dicosola | G09F 21/08 |
| | | | 701/3 |
| 2023/0144456 A1 * | 5/2023 | Ferguson | G06Q 20/401 |
| | | | 705/26.81 |
| 2024/0013144 A1 * | 1/2024 | Lert, Jr. | G06Q 10/00 |

* cited by examiner

81

<u>200</u>

Insert Bag(s) and Batterie(s) into empty drone tote — 207

Induct drone tote into Alphabot system — 209

A ···· Store and charge drone tote — 215

Receive drone delivery order — 223

Retrieve drone tote to picking workstation — 227

Transfer ordered items — 229

Transport drone tote to drone pick up platform — 234

Insert charged batteries into drone — 238

Insert depleted batteries into drone tote — 243

Transfer ordered items to drone — 247

Insert empty bags into drone tote — 251

Transport drone tote to storage — 257

APPARATUS AND METHOD FOR REPLACING POWER SUPPLY DEVICE IN A UAV

CROSS-REFERENCE TO RELATED APPLICATION(S)

This application claims the benefit of U.S. Provisional Application No. 63/355,858, filed Jun. 27, 2022, which is incorporated by reference in its entirety herein.

BACKGROUND

Technical Field

The exemplary and non-limiting embodiments described herein relate generally to an order fulfillment facility with a delivery system having plurality of mobile robots with containers to bring customer orders and/or power supply device/s to UAV/s for final delivery, and more particularly to a method of replacing and monitoring power supply devices thereof.

Technical advancement in last mile delivery orders are taking a center stage. These deliveries have been traditionally performed with orders arriving at a storage and distribution center and then delivered at customer doorstep by a human. Recently, autonomous aerial or ground vehicles are becoming a market favorite in achieving the final delivery. A network of autonomous vehicles is typically sent into the field to deliver customer goods (packages, grocery or items of similar nature) in a timely and fuel-efficient manner. A variety of power supply devices are used for autonomous vehicles in which an electrically powered battery is considered most economical and environment friendly. Maintenance and replacement of the power supply device is a challenge and adds time-constraints to the delivery cycle.

The present disclosure aims at providing an efficient system and method to replace power supply device in an unmanned aerial vehicle deployed for last mile delivery. The disclosure further aims to provides a unique approach is charging and maintaining the power supply device/s prior to being selectively deployed for operating a UAV.

SUMMARY

The following summary is merely intended to be exemplary. The summary is not intended to limit the scope of the claims.

In accordance with an example embodiment, a delivery system is provided. The delivery system comprising an unmanned aerial vehicle (UAV) for transporting a customer order from an order fulfillment facility to a delivery location, the order fulfillment facility comprising a central control system to regulate operations therein, the UAV comprising a goods section configured to house the customer order and a power-supply section configured to receive one or more power supply device to power the UAV. The delivery system further provides a UAV docking station, a workstation preferably disposed proximal to the UAV docking station, an operator to load or unload the UAV, a mobile robot configured to transport a container from the order fulfillment facility to the workstation station, the container having a first compartment to house the customer order, a second compartment to receive the one or more power supply devices and a divider configured to isolate the first compartment from the second compartment. The second compartment further comprises a power supply port to interface with charging terminals of the one or more power supply device positioned therein. The delivery system further comprises a storage location with a plurality of containers stationed to be charged throughs a power outlet that interfaces the power supply port on the container.

In accordance with an example embodiment, the delivery system further comprises a monitoring system in operative communication with the central control system and includes a scan module, a memory module to store and update parameters related to the power supply device, and a charge controller to gather one or more of the power supply device parameters and regulate power supplied to the power supply device. The exemplary order fulfillment center further provides charging the one or more power supply device when the container is stationed at the storage area. The exemplary monitoring system tracks location of the container and further monitors the one or more power supply parameters of the power supply devices.

In accordance with an example embodiment, a container is provided. The container is removably disposed on a mobile robot that transports the container from a storage location to a workstation. The container provides a first section to receive goods from an order fulfillment facility, a second section, adjacent to the first section, to house one or more power supply device and a divider between the first section and the second section to ensure the one or more goods are maintained in desirable condition. The exemplary container further provides one or more power supply ports located in the second section such that the one or more power supply device accesses power outlets via the respective one or more power supply port. The one or more power supply device is charged when the container is stationed at the storage location.

In accordance with an example method of replacing one or more power supply device in an unmanned aerial vehicle (UAV) is provided. The UAV comprises a goods compartment and a power supply compartment, the goods compartment to receive the customer order and one or more power supply device, respectively. The exemplary method further comprises docking the UAV proximal to a workstation to load the order box into the goods compartment, determining a power level of the one or more power supply device in the power-supply compartment, determining whether the one or more power supply device needs replacement, receiving a container at the workstation through mobile robots, the container comprising a first section having the customer order and a second section having completely charged one or more power supply device and a separation therebetween.

In accordance with an example, the method further comprises, loading the goods compartment of the UAV with the order box from the container and replacing the one or more power supply device on the UAV with the completely charged one or more power supply device housed in the container. The container further comprises a power supply port located in the second section such that a charging terminal of the one or more power supply device interfaces the power supply port.

BRIEF DESCRIPTION OF THE DRAWINGS

The foregoing aspects and other features are explained in the present disclosure, taken in connection with the accompanying drawings, wherein:

FIG. 11 and FIG. 12 illustrate block diagrams of an operation at the order fulfillment facility.

FIG. 1 through FIG. 12 illustrate, schematic view/s and block diagram/s of an order fulfillment facility with a delivery system having plurality of mobile robots with containers to bring customer orders and/or power supply device/s to UAV/s for final delivery. The figures further illustrate charging and monitoring of replenished power supply devices for subsequent delivery cycles.

DETAILED DESCRIPTION

Embodiments of the present disclosure will now be described with reference to the Figures, which in general relate to an order fulfillment facility with a delivery system having plurality of mobile robots with containers to bring customer orders and/or power supply device/s to UAV/s for final delivery. The present disclosure further relates to replacing, charging, and monitoring power supply device/s that operate the UAV.

It is understood that the present embodiments may be embodied in many different forms and should not be construed as being limited to the embodiments set forth herein. Rather, these embodiments are provided so that the present disclosure will be thorough and complete and will fully convey the invention to those skilled in the art. Indeed, the embodiments are intended to cover alternatives, modifications, and equivalents of these embodiments, which are included within the scope and spirit of the invention as defined by the appended claims. Furthermore, in the following detailed description, specific details are set forth in order to provide an understanding of the present embodiments.

The terms "top" and "bottom," "cupper" and "lower" and "vertical" and "horizontal" as may be used herein are by way of example and illustrative purposes only and are not meant to limit the description of the embodiments inasmuch as the referenced item can be exchanged in position and orientation. Also, as used herein, the terms "substantially" and/or "about" mean that the specified dimension or parameter may be varied within an acceptable manufacturing tolerance for a given application. In one non-limiting embodiment, the acceptable manufacturing tolerance is +0.25%.

The disclosed embodiment may utilize apparatus and methods as disclosed in U.S. Pat. No. 9,139,363 and entitled "Automated System for Transporting Payloads", U.S. Pat. No. 9,598,239 and entitled "Automated System for Transporting Payloads", U.S. patent application Ser. No. 15/171,802 filed Jun. 2, 2016 and entitled "Storage and Retrieval System", U.S. patent application Ser. No. 15/591,956 filed May 10, 2017 and entitled "Order Fulfillment System", U.S. patent application Ser. No. 15/816,832 filed Nov. 17, 2017 and entitled "Order Fulfillment System", U.S. patent application Ser. No. 15/867,373 filed Jan. 10, 2018 and entitled "System and Method of Robot Task Assignment and management", U.S. patent application Ser. No. 15/826,045 filed Nov. 29, 2017 and entitled "Inventory Management System", U.S. patent application Ser. No. 15/884,677 filed Jan. 31, 2018 and entitled "Automated Proxy Picker System for Non-Fungible Goods"; and U.S. patent application Ser. No. 15/884,938 filed Jan. 31, 2018 and entitled "Packing by Destination for Automated Fulfilled Goods" all of which are incorporated by reference herein in their entirety.

Figure 1:
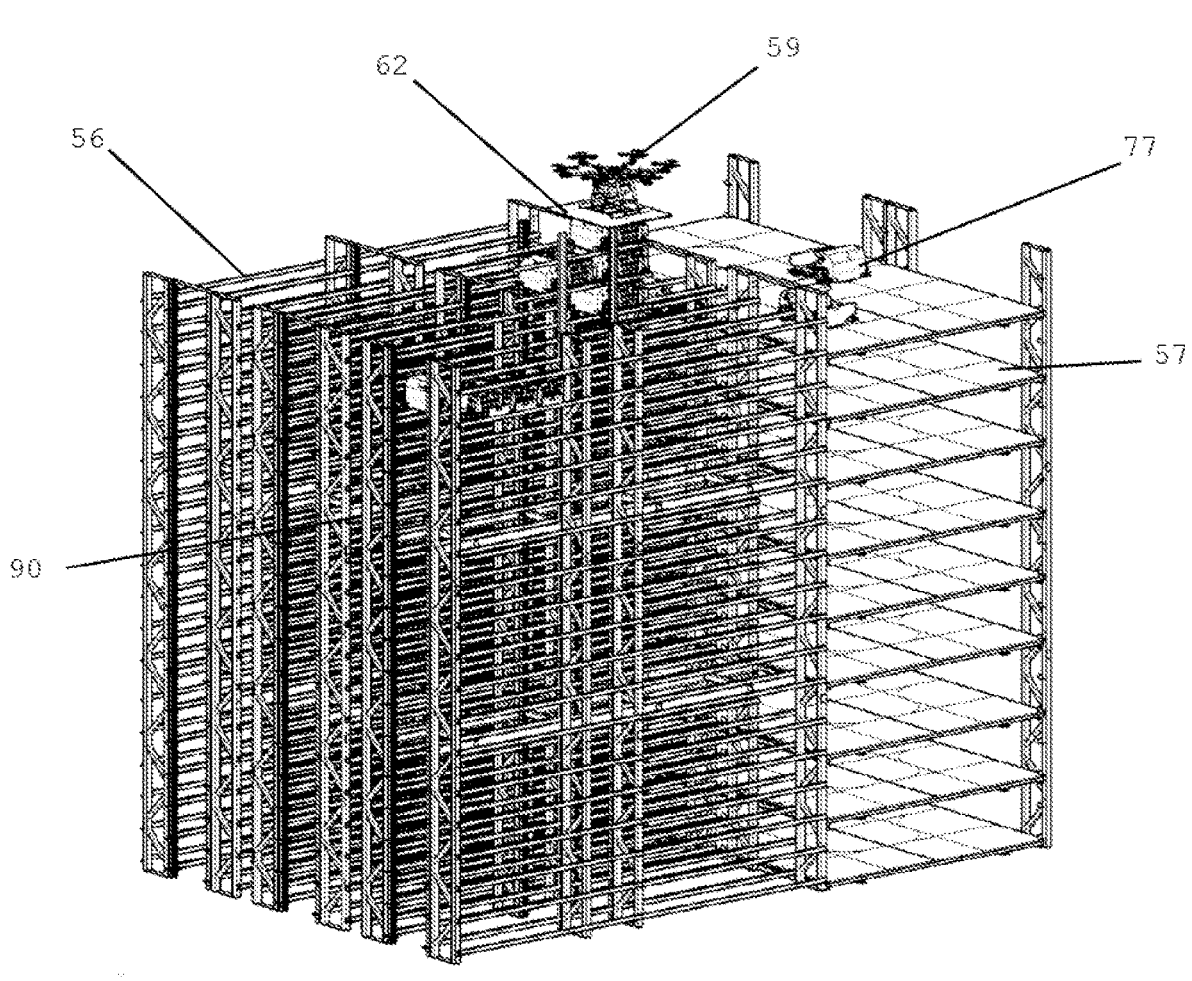
FIG. 1 illustrates a perspective view of an order fulfillment center with docking station for UAV/s to receive and deliver customer orders.

Referring to FIG. 1, Order fulfillment facility 55 further comprises a storage structure 56. The storage structure 56 is composed of several vertical and horizontal rails forming a multi-level structure. The vertical and horizontal rails may unanimously form pathways for transporting an item between multiple locations within or in the periphery of the storage structure 56. A fleet of mobile robots 77 may operate in the order fulfillment facility 55. In one embodiment, the order fulfillment facility 55 may include a deck area 57 connected to the storage structure 56 such that the mobile robots 77 may travel therebetween. The storage structure 56 may be sectioned into temperature zones to facilitate storing a variety of non-fungible or fungible items. The storage section may further allow storing container 81 such as a tote, rack, vessel, holder, etc., that may serve as a receptacle for the items. Storage structure 56 in the present embodiment may include power supply source/s 90 such as a power outlet/s to interface a power supply device.

The order fulfillment facility 55 may further comprise a docking station 63 for landing or take off for one or more unmanned aerial vehicles (UAV) 59. The docking station 63 may be positioned at a roof of the order fulfillment facility 55 or at a level accessible to the UAV 59. The docking station 63 may be constructed such that the robot 77 may access the docking station 63 via the storage structure 56, the deck area 57 or any other pathway provided in the order fulfillment center. In another embodiment, the order fulfillment center 55 may provide dedicated pathway/s for the robot 77 to access the docking station 63. In yet another embodiment, the order fulfillment center 55 may include a workstation 65 separate from the docking station 63 such that the robot 77 can access the workstation 65 (FIG. 7) and/or the docking station 63, as needed. Additional description on use of the container 81, interface with power supply sources 90 and operation of the workstation 65 is the following disclosure.

Figure 2:
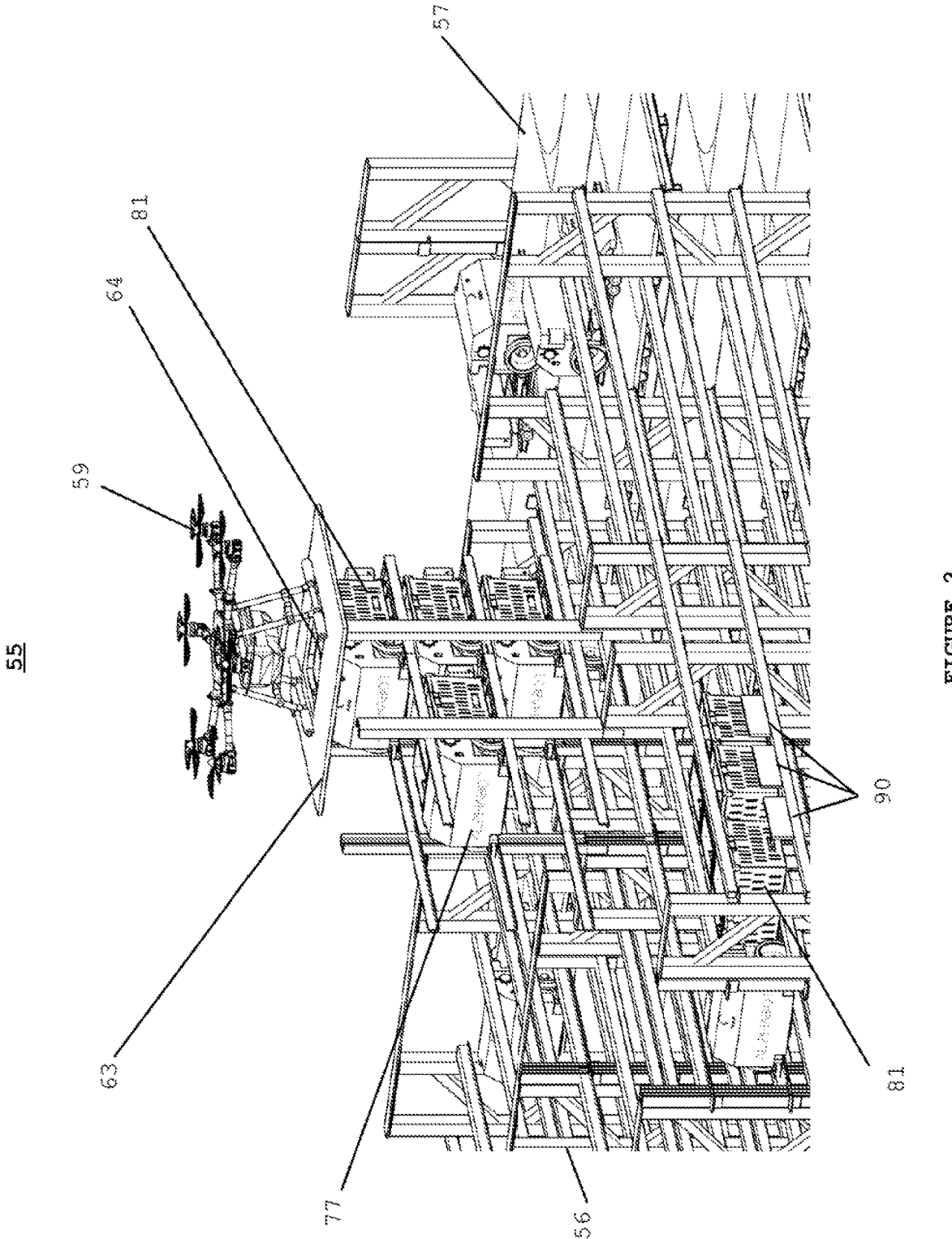
FIG. 2 illustrates yet another perspective view of an order fulfillment center with mobile robots carrying containers to UAV docking station.

Referring now to FIG. 2 depicting a magnified perspective view of an operation or a part of an operation in the order fulfillment facility 55 when UAV 59 is employed to collect and delivery a customer order. Plurality of mobile robots 77 are queued to access docking station 63. Container 81 comprising one or more customer orders and/or power supply devices/s are disposed on mobile robot 77. UAV 59 docks at docking station 63 that may also serve as a loading platform. Docking station 83 includes an access window 64 such that goods section or cargo section of UAV 59 is accessible there through. In present embodiment, a first mobile robot 77 may position such that respective first container 81 interfaces access window 64. Customer order/s are loaded into goods section of UAV 59 via a loading or transferring mechanism that may be manual or automated. First container 81 includes charged power supply device that may replace the used power supply device on UAV 59. Now vacant, first container 81 may receive used power supply devices and first mobile robot 77 transports said devices to a charging station comprising power supply source/s 90.

Second mobile robot 77 with second container 81 may position such that second container 81 successively interfaces access window 64.

Figure 3:
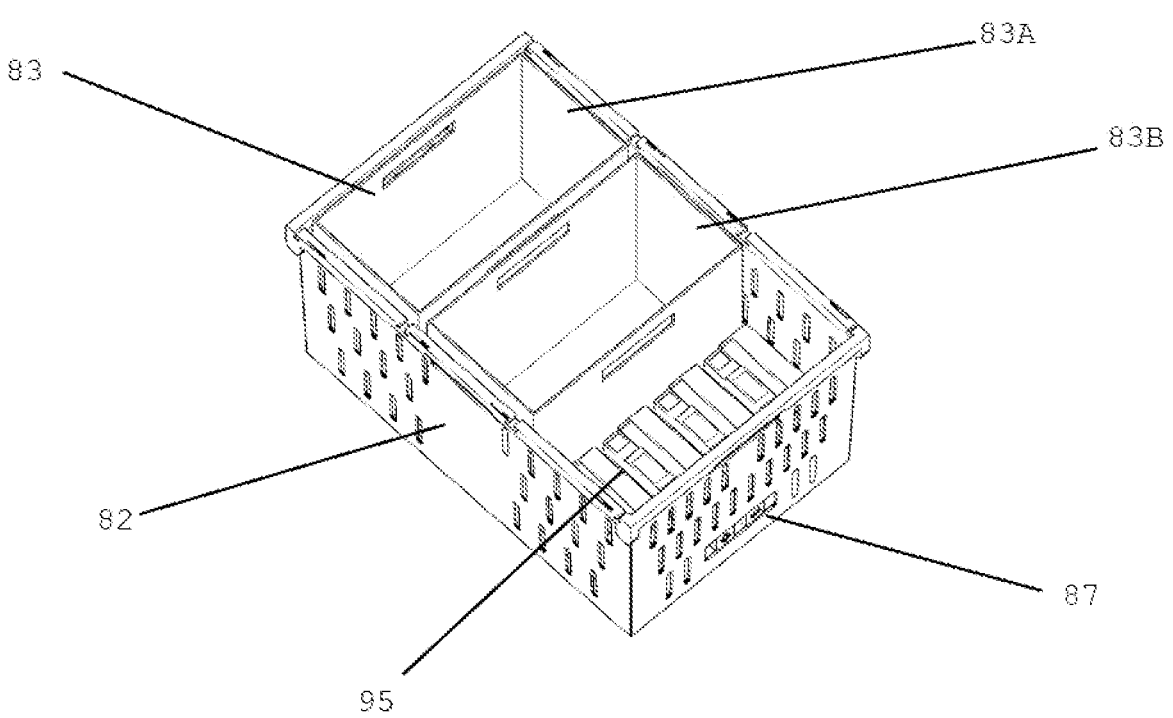
FIG. 3 and FIG. 4 illustrate container configured to carry customer order and/or power supply devices FIG. 5 illustrate storage are with containers stationed for charging and monitoring power supply devices therein.
Figure 4:
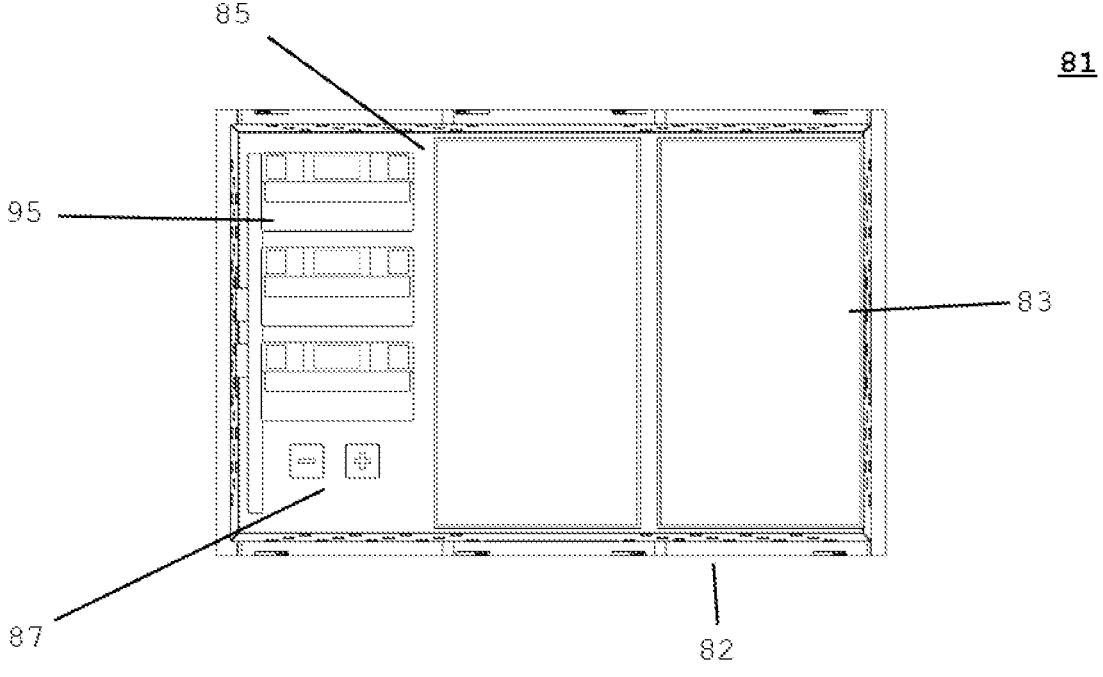
Figure 7:
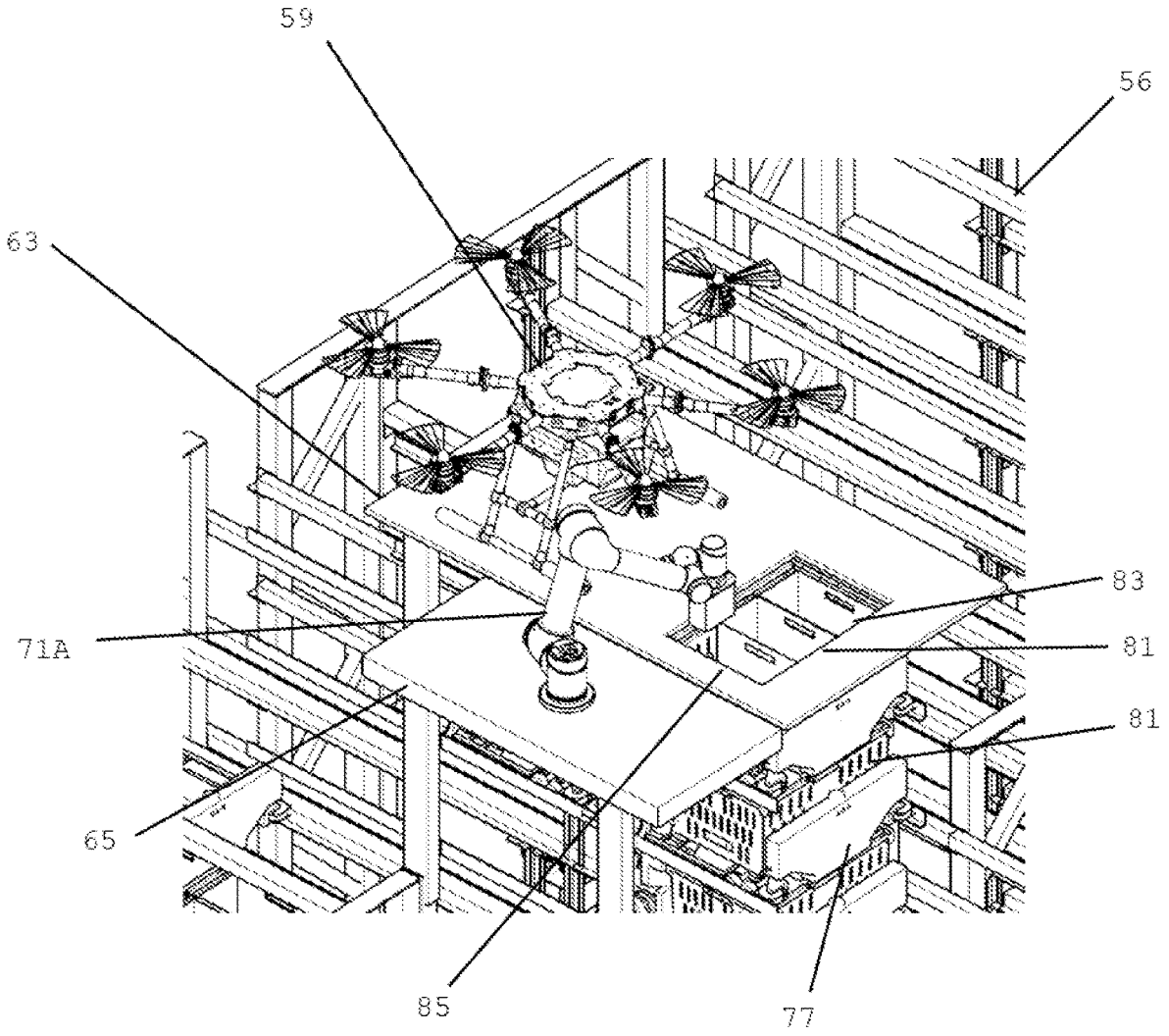
FIG. 7 and FIG. 8 illustrate a top perspective view of the order fulfillment facility with workstation and a UAV docking station.

Referring now to FIG. 3 and FIG. 4, that depict a perspective view and top view respectively, of container 81. As briefly described in earlier portion of this specification, container 81 may be stationed at storage structure 56. Mobile robot 77 may transport container 81 between multiple locations at storage structure 56 and/or in periphery of the storage structure 56. For present embodiment, mobile robot 77 may transport container 81 to and from docking station 63 (FIG. 2) or workstation 65 (FIG. 7). Robot 77 (FIG. 2) may include a retaining mechanism to receive and hold container 81. The container 81 may further comprise one or more complementary mechanism/s to engage with mobile robot 77. Further, inside of container 81 may include engaging means to receive and retain a plurality of bags that can further hold fungible or non-fungible items. In some embodiments, container 81 may provide receptacles for sub-containers 83A, 83B that may further include engaging means to receive the bags. These bags may be plastic, paper, or any other recyclable material. Further, container 81 may be constructed using a lightweight material such as plastics, including but not limited to, acrylonitrile-butadiene-styrene (ABS), acrylics, polyethylene (PE), polypropylene (PP), or polyvinyl chloride (PVC). In some embodiments, container 81 may be constructed of one or more metallic alloys. For the present embodiment, container 81 may be made from carbon fiber or similar material for efficient handling. Container 81 may be constructed of a fire-proof or fire-containing material or may include an additional layer of similar material to isolate environment external to container 81, in case of a fire hazard or unfavorable rise in temperature inside container 81.

Continuing to refer to FIG. 3 and FIG. 4. Container 81 may comprise first section 83 to receive and transport a plurality of varying non-fungible items. A second section 85 of the container 81 may serve as receptacle for one or more power supplying devices such as a battery, including but not limited to, lithium-ion battery, lithium-polymer battery, etc. First section 83 may be further segregated based on types or temperatures of items received therein. As described earlier, container 81 may comprise sub-containers 83A, 83B and so on, to segregate items. First section 83, with or without the sub-containers 83A, 83B, is constructed to maintain one or more divider between the first section 83 and second section 85. The divider may be a dividing barrier, a sub-container wall, container wall or a receptacle wall wherein the receptacle holds one or more power supplying devices 95. Container wall 82 encloses the first section 83 and second section 85 such that any items within first section 83 and power supply device within second section 85 may be safely transported within the order fulfillment center 55 (FIG. 1).

Container 81 further comprises power supply port 87 disposed in second section 85. Power supply port 87 may serve as interface between charging terminals on power supply device/s 95 and power outlet/s disposed external to container 81. Second section 85 receives one or more power supply device/s 95 such that respective charging terminals contact or align with power supply port 87. When the container 81 is stationed at the storage area 56 (FIG. 1, FIG. 2), second section 85 of container 81 faces power outlet/s provided in the storage area, resulting into charging of power supply device/s 95 via power supply port 87. In one embodiment, mobile robot 77 delivers container 81 at storage area such that container 81 slides and consequently established contact between charging terminals of power supply device/s 95 and power outlets via power supply port 87. In some embodiments, power supply port 87 may be provided on container wall 82 to interface with respective charging terminals of all power supply device/s 95 in second section 85. In a preferred embodiment container 81 may be prepped with one or more bags placed therein and second section 85 comprising power supply device/s 85 that need charging.

A variety of charging methods may be used to charge power supply device/s 95. One such method may be positioning power supply device/s 95 in series and provide electrical contact to respective negative and positive terminals and supply an aggregated voltage across. In another embodiment, a charge controller may be positioned at power supply source 90 and separate electrical contacts may be provided for each power supply device 95 disposed therein. Charge controller may deliver and measure power to each power supply device 95 and further determine respective power status thereof. Alternatively, charge controller may be positioned onboard container 81. In some embodiments, contact-less charging of power supply device/s 95 may be established, for example, but not limited to, inductive charging, resonance charging or radio charging. It should be noted, when transmitting power in contact-less charging, power supply device/s 95 may continue to reside within container 81. Another embodiment may provide a monitoring system in communication with central control system. The central control system may store history and/or plurality of health parameters related to power supply device/s 95. Power supply devices 95 may include identifier such as a barcode, an RFID tag or a similar scannable or tracking components. A scanning module may identify power supply device 95 before inducting the power supply device into charging station at order fulfillment center 55 (FIG. 1 and FIG. 2). On identification, power supply memory module of the central control system may transmit respective power supply device history and/or health parameters. These parameters may include information such as device state, charge cycles, length of charge cycles, number of delivery operations performed, etc. This information may be helpful in determining appropriate power supply device for specific delivery operations.

Figure 5:
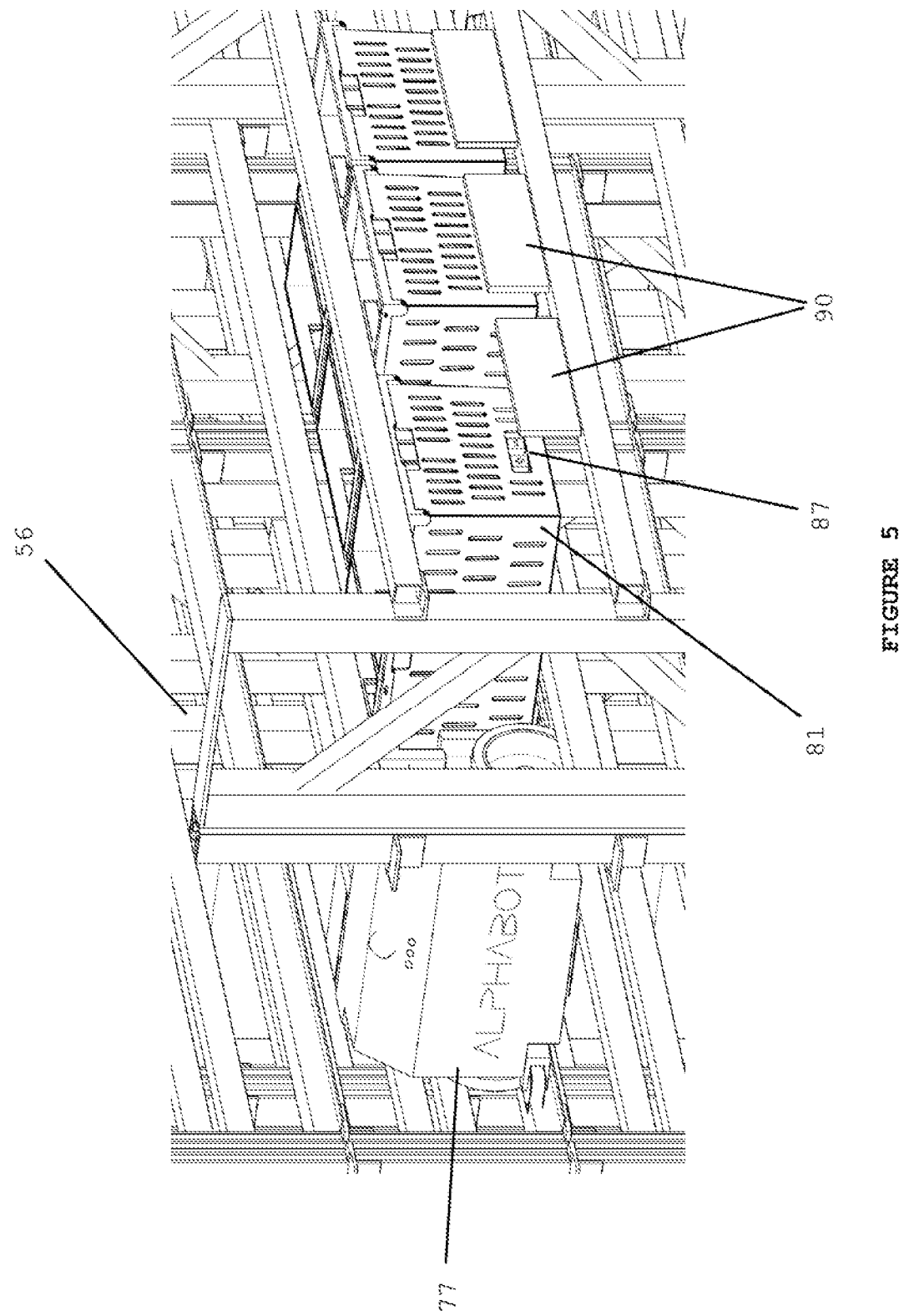

Referring now to FIG. 5 that depicts a magnified perspective view of the order fulfillment center 55. FIG. 5 further depicts a portion of storage area 56 where plurality of containers 81 are stationed. The containers 81 may be oriented to allow charging of power supply devices some embodiments, container 81 may be dedicated to receiving only power supply device/s 95 therein. In one embodiment, robot 77 may bring container 81 comprising power supply device/s 95 that require charging. Container 81 may be egressed from robot 77 and positioned such that power supply port 87 aligns with power outlet 90. Power supply device/s 95 located in second section 85 of container 81 are further oriented such that charging terminals of power supply device/s 95 contact power supply port 87. Thus, charging terminals of power supply device/s 95 interface respective power supply outlet/s 90 to replenish power therein. As described earlier, container 81 may comprise a first section 83 dedicated to carry a variety of non-fungible items and a second section 85 dedicated to carrying power supply devices 95. In some embodiments, container 81 may be entirely dedicated to carry power supply devices to power outlet/s 90 at the storage structure 56.

Figure 6:
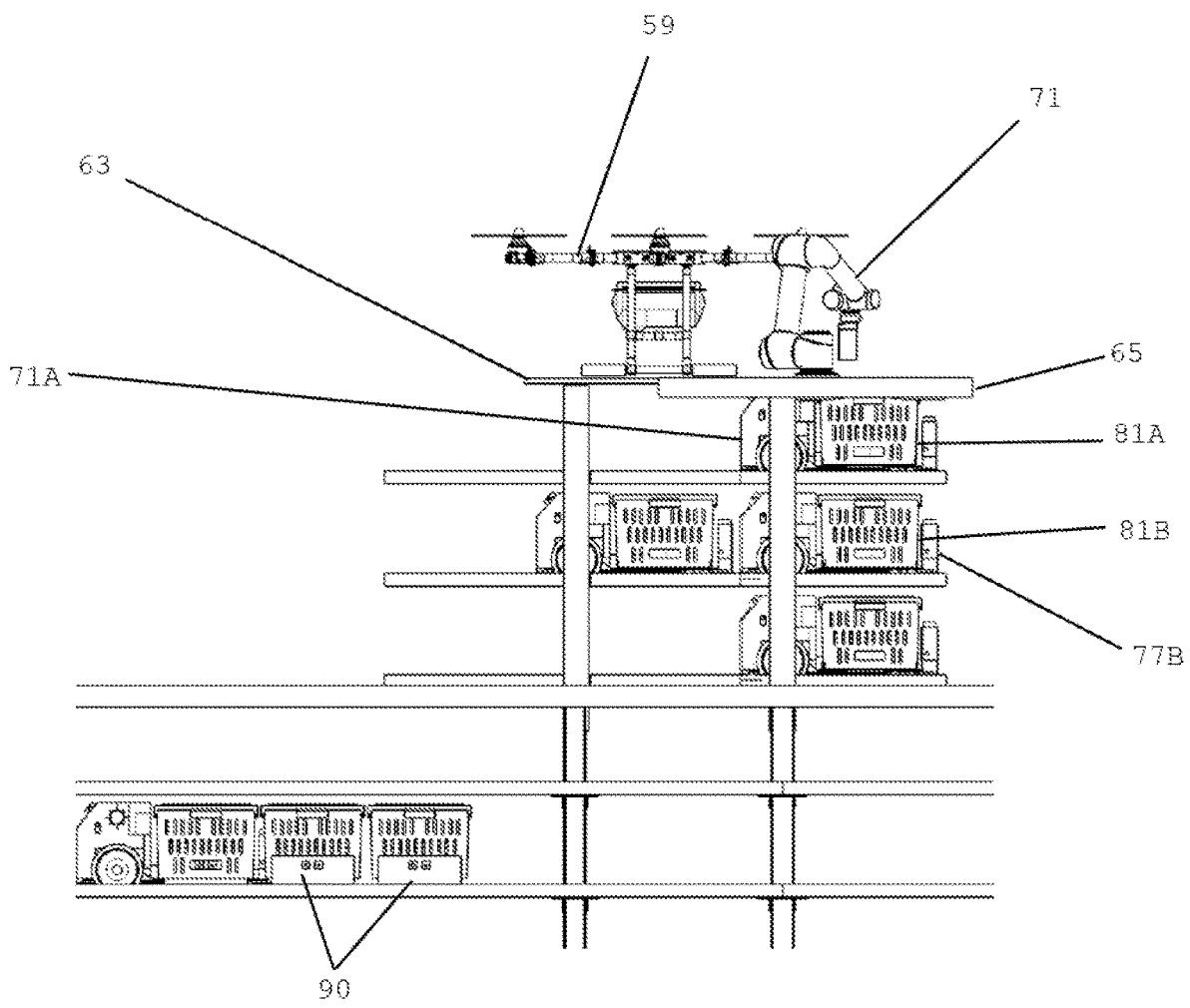
FIG. 6 illustrates a magnified side view of the order fulfillment facility depicting loading/unloading, power supply device replacement and charging thereof.
Figure 8:
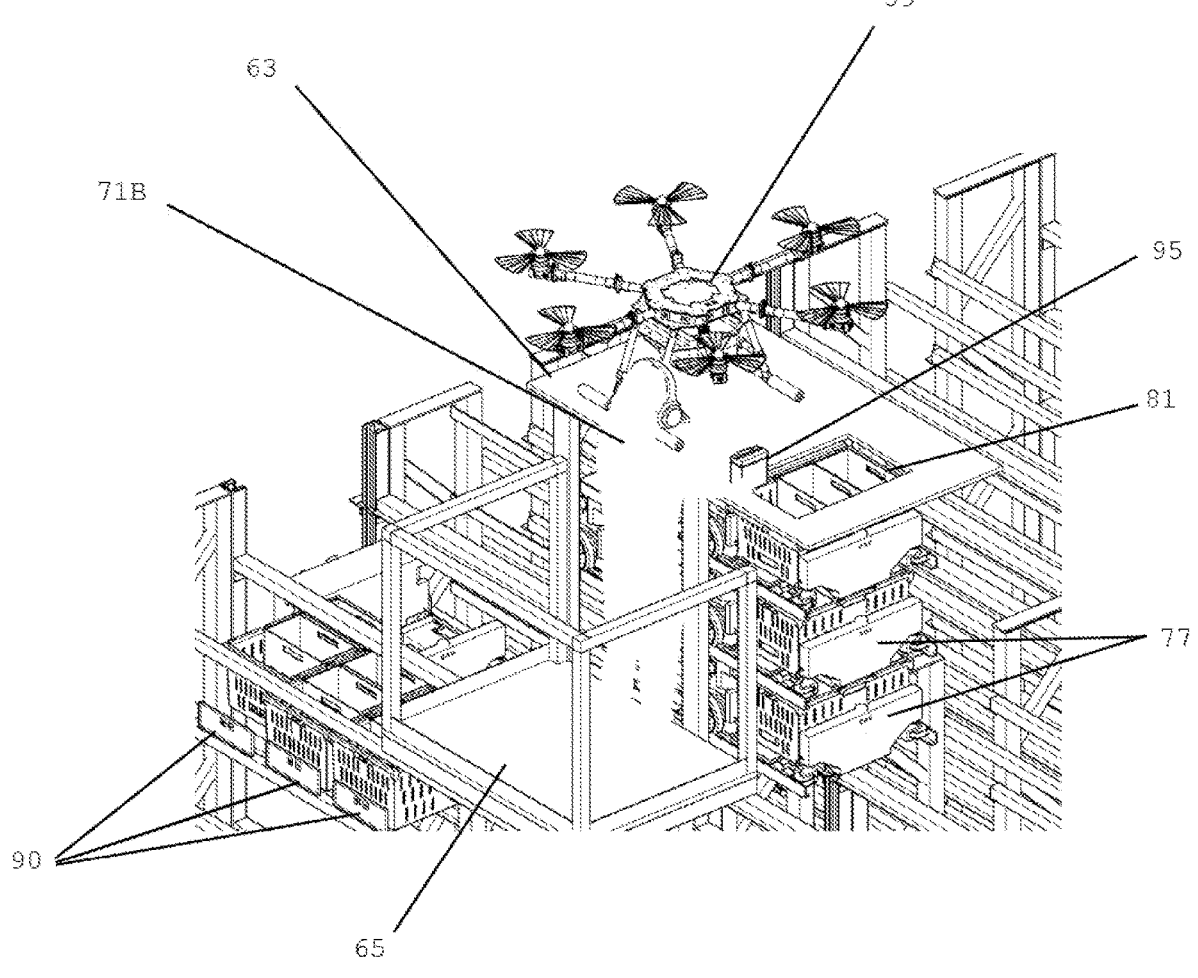

Referring now from FIG. 6 to FIG. 8, that depict a perspective view of loading an unmanned aerial vehicle (UAV) 59 to delivery one or more customer orders. UAV 59, depicted herein, may belong to a fleet of UAVs operating to fulfill one or more customer orders. Further, UAV 59 may include a goods section to receive and carry customer orders and a power supply section to receive power supply devices its operation. UAV 59 may land/take off from a docking station on or in vicinity of order fulfillment center 55 (FIG. 1 and FIG. 2). One or more customer orders may be loaded to UAV 59 by operator/s employed at a workstation proximal to the docking station. If required, the operator may also replace power supply device/s on the UAV 59 with charged power supply devices. The charged power supply devices may be carried in container 81 that is transported to the workstation by robot 77. Operator may deposit the uncharged power supply device/s retrieved from the UAV in the container 81. Robot 77 may transport the uncharged devices to charging section of storage area 56 to recharge the power supply devices for another UAV operation.

FIG. 6 depicts a side view of a portion of storage area 56. In present embodiment, docking station 63 is located on roof of storage area 56. Workstation 71 is located functionally connected to the docking station 63 and comprises operator 71. Operator 71 is positioned to access goods section as well as power supply section of the UAV 59. Mobile robot/s 77 may travel multiple levels of storage structure 56 to access workstation 65 and transport container 81 thereto. Container 81 may comprise ready customer orders along with charged power supply device/s 95 to be loaded to UAV 59. Mobile robot 77 may temporarily park at workstation 65 such that operator 71 accesses container 81 to pick one or more customer orders from first section 83 (FIG. 3 and FIG. 4) and transfer them to goods section of UAV 59. Operator 71, based on instructions provided by a central control system, may replace power supply device/s on UAV with completely charged power supply devices in second section 85 of container 81. In some embodiments, a first container 81 may be dedicated to one or more customer orders and a second container 81 may be dedicated to power supply devices. In a preferred embodiment, robot/s 77 may be queued such that an exemplary first robot 77A is positioned at the workstation to receive discharged power supply devices into respective first container 81A. The first robot 77A departs the workstation and transports container 81A with discharged power supply devices to charging station at storage area 56. On departure of the first robot 77A, a second robot 77B with container 81B is likewise positioned on workstation. Container 81B may be prepped to comprise one or more customer orders in first section and charged power supply devices in second section 85. Operator 71 loads the one or more customer orders into UAV 59 and further installs the charged batteries from container 81B. Container 81B remains in position to receive the discharged power supply device from the subsequent UAV. Purpose of above-described operation of fleet of robot/s 77 is to maintain continuity and efficiency in delivering customer orders. A variety of permutations and combinations of container 81 usage may be employed to achieve a set frequency of ingress-egress of robot/s 77 at the above-described operation. In present embodiment, completely charged power supply device/s replace power supply device/s partially utilized by the UAV for each delivery. In another embodiment, operator 71 may evaluate health of power supply device/s retrieved from UAV 59 to determine whether the power supply device/s should stay in operation before transporting the power supply devices/s to respective charging stations. In yet another embodiment, power supply device health may be evaluated and monitored at the charging station.

FIG. 7 and FIG. 8 depict a top left-side perspective view of an order fulfillment facility 55. In the present embodiment, UAV 59 lands/takes off from a docking station 63 proximal to workstation 65. A fleet of robot/s 77 may be queued to access workstation 65 to transport respective container/s 81, thereto. Operator 71 may perform picking and/or replacing operations at workstation 65. In one embodiment, operator 71A may be an automated operator such as but not limited to, a robotic arm configured to pick and transfer one or more customer orders from container 81 of robot 77, that is positioned at or proximal to docking station 63. Automated operator 71A may be stationed proximal to UAV docking station 63 or may be raised or transported to operate therewith. In some embodiments, automated robot 71A may be remotely guided by a human operator. FIG. 8 depicts a human operator 71B positioned proximate a dynamic workstation 65 disposed proximal to docking station 63. Human operator 71B may manually load UAV 59 with one or more customer orders from container 81. In case of depletion of charge of power supply devices in UAV 59, human operator 71B may replace the power supply devices with charged devices transported to docking station 63 through robot 77. An exemplary power supply device 95 may be, but not limited to, a lithium-ion battery as in FIG. 8. Workstation 65 may be a dynamic workstation resided at a lower level of the order fulfillment center and may be elevated or transported proximal to the UAV docking station 63, when necessary. A plurality of safety measures may be employed to ensure a protected work for human operator 71 operating proximal to UAV docking station 63. with a human operator 71 at working.

Figure 9:
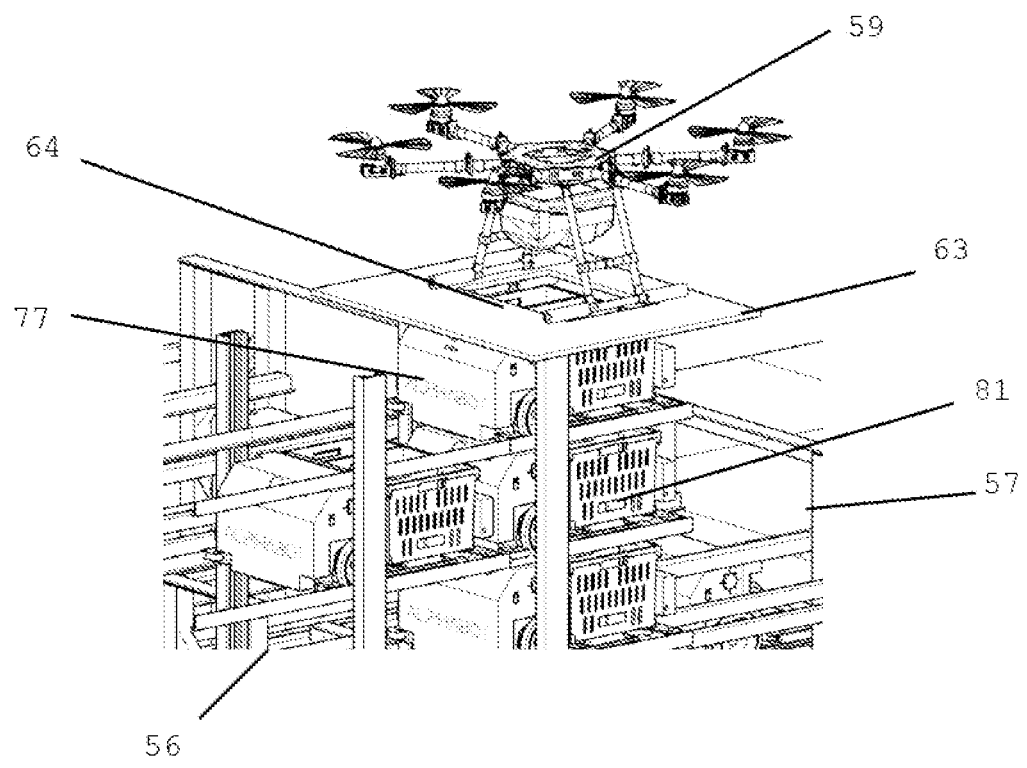
FIG. 9 and FIG. 10 illustrate UAV interfacing container on mobile robot to pick customer order.
Figure 10:
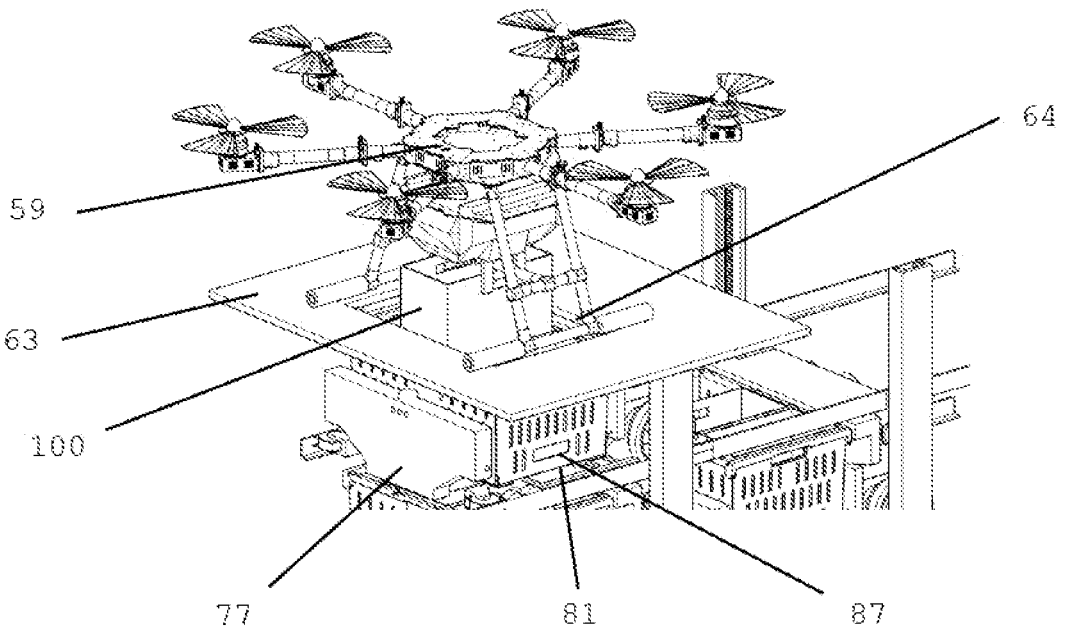

Referring now to FIG. 9 and FIG. 10 that depict an order fulfillment center 55 with a roof-top UAV docking station 63 comprising a loading/unloading platform. Docking station 63 comprises an access window 64 to allow a robot 77 to access the docking station 63 therethrough. In a preferred embodiment, UAV 59 may land on docking station 63 such that a goods compartment of UAV 59 is exposed to access window 64. Robot 77 is positioned under access window 64 such that container 81 of the robot 77 and goods compartment of UAV 59 are operatively aligned. Docking station 63 may employ one or more loading/unloading mechanism to transfer customer order/s 100 from container 81, closely aligned with the access window 64, into goods compartment of UAV 59. FIG. 10 depicts an exemplary customer order 100 in transit from robot 77 to UAV 59. The one or more loading mechanism may be further configured to replace discharged power supply device/s from UAV 59 by charged power supply devices delivered by one of queued robots 77.

Figure 12:
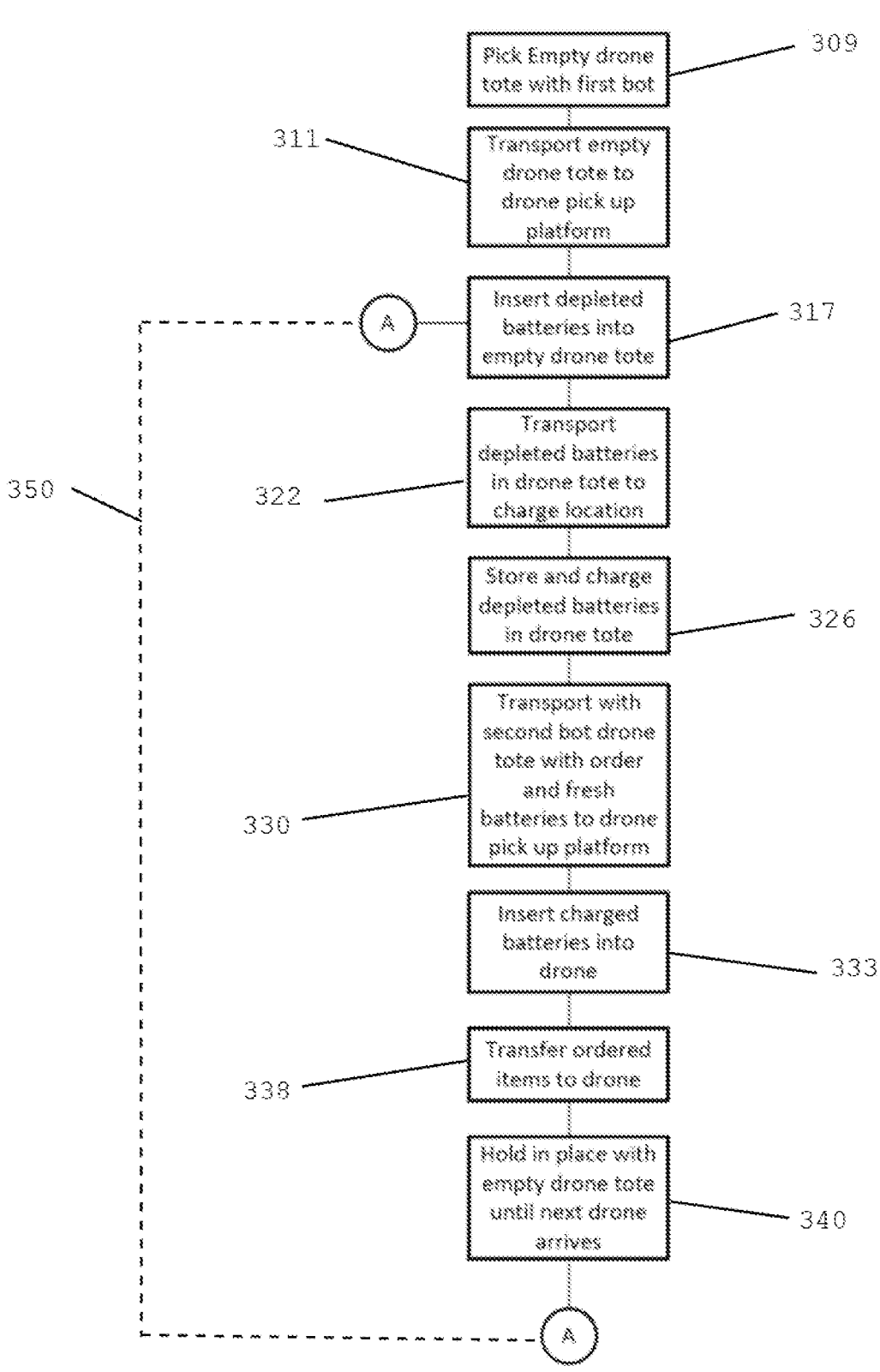

Referring now to FIG. 11 and FIG. 12, a process diagram depicting operation in an exemplary order fulfillment center such as the order fulfillment center 55 shown in FIG. 1 and FIG. 2. The order fulfillment center is part of a delivery system employing one or more UAVs for transferring customer orders from order fulfillment center to customer location. In 207, one or more containers are prepped with empty bags and one or more power supply devices. Automated or manual bagging of containers may be performed at a ground workstation. In 209, the prepped container is received in the order fulfillment center. As described earlier, the order fulfillment center comprises a fleet of mobile robots configured to transport containers from one location to another. One such mobile robot facilitates inducing prepped container into the order fulfillment center operations. At 215, the mobile robot brings the container to charging station within a storage area in the order fulfillment center. The one or more power supply devices may comprise identifiers such as, but not limited to, barcode labels, RFID tags or comparable tracking devices. Besides charging power supply device at the charging station, a health status of the power supply devices may be determined and monitored at the station.

In 223, a customer order may be communicated to the order fulfillment center through an internal data bus or over wifi or similar communication methods. Besides the customer order, the communication package may further comprise location of delivery, distance and/or duration to customer location and any other parameters to determine appropriate power supply device to operate the delivery UAV. At 227, a mobile robot retrieves and transports container comprising fully charged power supply devices. In a preferred embodiment, the mobile robot retrieves and transports container comprising power supply device/s that match requirements in the communication package to ensure delivery of customer order in a timely and fuel-efficient manner. At 229, the container is dispatched to a workstation where an operator transfers items in the customer order to the container. At 234, the container is dispatched to another workstation or loading platform proximal to the UAV docking station. At 238, one or more power supply devices in the container may be loaded into the UAV power supply section. In some embodiments, before replacing the power supply devices, an operator may determine health and power level of power supply devices present of the UAV and determine if a replacement is required. In other embodiments, power supply device diagnostics may be monitored at the UAV a sensory indictor may suggest the operator whether replacing is required. In the present embodiments, a central control system may receive the customer order along with the communication package related to the delivery and determine appropriate power supply device/s to be installed into the UAV.

At 234, used power supply devices for UAV may be placed in, now vacant, power supply section of the container. At 247, customer order items are placed in a goods section of the UAV. The items may be carried in a bag or a box in the container, the bag or box may be loaded into the UAV by a human or non-human operator. Once loaded with the order and the power supply device the UAV takes off from the docking station. At 251, the empty container with used power supply devices may return to storage area. The empty container may be re-prepped with bags to receive another customer order. The empty container may carry the used power supply device/s to charging station. The used power supply devices may then be replenished and monitored for next delivery cycle. As described earlier, power supply devices are monitored actively, such as setting a timer that is configured to halt power supply when the power supply device/s is sufficiently charged. Active control and monitoring of the power supply devices may be achieved by providing a charge controller in operative communication through a wired or wireless connection.

FIG. 12 depicts an exemplary operation 300 for enhancing continuity in the delivery system. A fleet of mobile robots is queued to delivery and/or collect power supply device/s and/or customer order to and from UAV docked proximal to workstation. At 309 and 311 a first mobile robot receives and transports a first container that may or may not be prepped to docking station. An operator (human, automated or otherwise) may remove used power supply device/s from UAV and place in the first container. At 322, first mobile robot carries the first container with used power supply device/s to charging station. At 326, first container is stationed at storage area for replenishing power and/or running a diagnostic check on the power supply devices therein. At 330, on departure of first mobile robot, second mobile robot with a second container is positioned at the dockings station. The second container comprises requested customer order along with one or more charged power supply device/s. At 333, an operator loads the UAV with charged power supply device/s and the requested customer order. At this point, second container is vacant. At 340, second robot stays at the docking station to receive used power supply devices from next UAV. Used batteries from next UAV are loaded into second container. At 350, a repeat loop is activated to perform 317.

In accordance with an example embodiment, a delivery system in relation to an order fulfillment center. The delivery system comprising, a UAV docking station for landing and take-off of the UAV a workstation proximal to the UAV docking station, the workstation further comprising an operator to load or unload the UAV, a mobile robot configured to transport a container from the order fulfillment facility to the workstation station, the container having a first compartment to house customer orders, a second compartment to receive one or more power supply devices and a divider between the first and second compartments. The divider serves to isolate the first compartment from the second compartment. The second compartment further comprises a power supply port to interface with charging terminals of the one or more power supply device. The delivery system further comprises a storage location with a plurality of container stations configured to station and charge the power supply device in the container. The system also provides a monitoring system in operative communication with the central control system at the order fulfillment facility. The monitoring system further provides a scan module to check the power supply device for identification, a memory module in operative communication with the scan module and positioned internal or external to the power supply device to store and update a plurality of power supply device parameters and a charge controller in operative communication with the memory module, the charge controller further configured to gather one or more of the power supply device parameters and regulate power supplied to the power supply device. The delivery system provides charging of power supply device in the container when the container is stationed at the storage area. The example monitoring system further tracks location of the container and monitors one or more power supply parameters of the power supply devices. Monitoring of one or more power supply parameters allows employing appropriate power supply device of a specific delivery operation.

In accordance with an example embodiment, a container is provided. The container is removably disposed on a mobile robot that transports the container from a storage location to a workstation. The container provides a first section to receive goods from an order fulfillment facility, a second section, adjacent to the first section, to house one or more power supply device and a divider to isolate the first section from the second section and ensure the one or more goods are maintained in desirable condition. The exemplary container further provides one or more power supply ports located in the second section such that the one or more power supply device accesses power outlets via the respective one or more power supply port. The one or more power supply device is charged when the container is stationed at the storage location.

In accordance with an example method of replacing one or more power supply device in an unmanned aerial vehicle (UAV) is provided. The UAV comprises a goods compartment and a power supply compartment, the goods compartment to receive the customer order and one or more power supply device, respectively. The exemplary method further comprises docking the UAV proximal to a workstation to load the order box into the goods compartment, determining a power level of the one or more power supply device in the power-supply compartment, determining whether the one or more power supply device needs replacement, receiving a container at the workstation through mobile robots, the container comprising a first section having the customer order and a second section having completely charged one or more power supply device and a separation therebetween.

In accordance with an example, the method further comprises, loading the goods compartment of the UAV with the order box from the container and replacing the one or more power supply device on the UAV with the completely charged one or more power supply device housed in the container. The container further comprises a power supply port located in the second section such that a charging terminal of the one or more power supply device interfaces the power supply port.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by volatile computer memory, non-volatile computer memory, hard drive, solid state memory, flash drive, removable disk and/or other media. Some or all of the devices may be implemented by a digital signal processor (DSP).

The foregoing detailed description has been presented for purposes of illustration and description. It is not intended to be exhaustive or to limit the description to the precise form disclosed. Many modifications and variations are possible in light of the above teaching. The described embodiments were chosen in order to best explain the principles of the claimed system and its practical application to thereby enable others skilled in the art to best utilize the claimed system in various embodiments and with various modifications as are suited to the particular use contemplated. It is intended that the scope of the method be defined by the claims appended hereto.

I claim:

1. A delivery system comprising an unmanned aerial vehicle (UAV) for transporting a customer order from an order fulfillment facility to a delivery location, the order fulfillment facility comprising a central control system to regulate operations therein, the UAV comprising a goods section configured to house the customer order and a power-supply section configured to receive one or more power supply devices to power the UAV, the delivery system further comprising:

a UAV docking station for landing and take-off of the UAV;

a workstation proximal to the UAV docking station, the workstation further comprising a loader to load or unload the UAV;

a mobile robot configured to transport a container from the order fulfillment facility to the workstation station, the container having a first compartment, a second compartment and a divider configured to isolate the first compartment from the second compartment;

wherein the first compartment is configured to house the customer order and the second compartment is configured to receive the one or more power supply devices;

wherein the second compartment further comprises a power supply port to interface with the power supply device therein;

a storage location comprising a plurality of container stations configured to park the container, the plurality of container stations further comprising at least one power outlet to interface with the power supply port on the container; and a monitoring system in operative communication with the central control system at the order fulfillment facility, the monitoring system further comprising:

a scan module configured to check the power supply device for identification; and a memory module in operative communication with the scan module and positioned internal or external to the power supply device and further configured to store and update a plurality of power supply device parameters;

wherein the container when stored at the container station allows charging of the one or more power supply devices located in the second section via the charge controller, wherein, the monitoring system tracks location of the container and further monitors the one or more power supply parameters of the power supply devices, and wherein the loader is configured to transfer the customer order from the container to the UAV and exchange the one or more power supply device on the UAV with a completely charged one or more power supply device on the container.

2. The delivery system of claim 1, wherein the container is constructed with a material to maintain an optimal temperature in the first and/or the second compartment.

3. The delivery system of claim 1, wherein the container is constructed with a fire-proof and fire containing material.

4. The delivery system of claim 1, wherein the first compartment of the container further comprises one or more sub-compartments to house plurality of fungible or non-fungible items, the one or more sub-compartments configured to serve as the divider.

5. The delivery system of claim 1, wherein the one or more power supply device is a lithium-ion battery or a lithium-polymer battery.

6. The delivery system of claim 1, wherein identification of power supply device are barcode tags, RFID labels or comparable tracking system.

7. The delivery system of claim 1, wherein the monitoring system further comprises a charge controller in operative communication with the memory module and configured to gather one or more of the power supply device parameters and regulate power supplied to the power supply device, an electrical harness establishes power and data connection between the power supply device/s, charge controller and the memory module.

8. The delivery system of claim 1, wherein the power supply device parameters are charge cycles, health status and health history of the power supply device/s.

9. The delivery system of claim 1, wherein the UAV docking station is located on a roof top of the automated storage and retrieval facility.

10. The delivery system of claim 1, wherein the operator is a non-human operator.

* * * * *